L. J. WESTNESS.
COMBINED FISH ROD AND REEL.
APPLICATION FILED MAY 12, 1913.

1,111,340.

Patented Sept. 22, 1914.
3 SHEETS—SHEET 1.

WITNESSES.
A. F. Miller.
Katherine Holt

INVENTOR.
Louis J. Westness
By Morrell & Caldwell
ATTORNEYS.

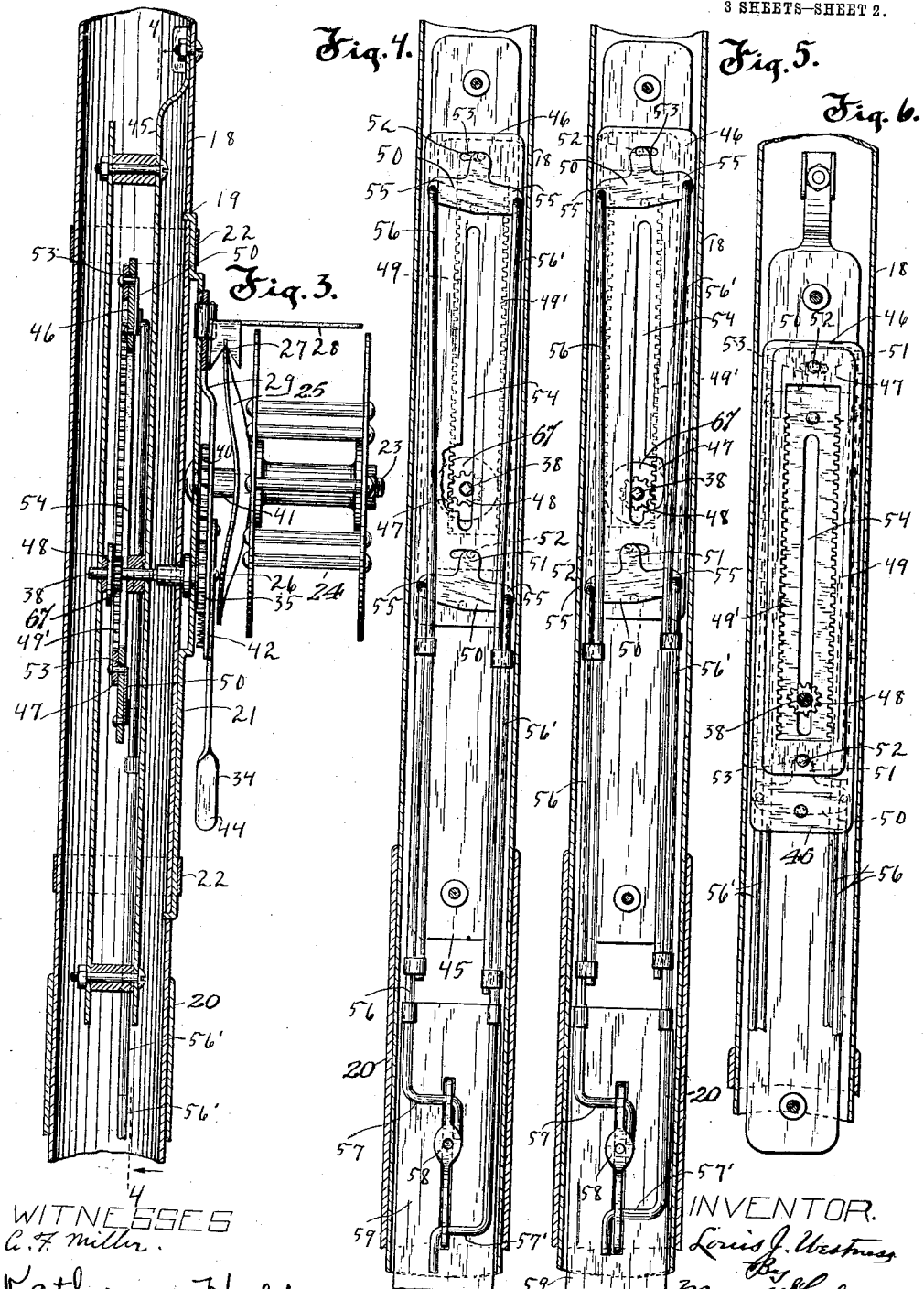

L. J. WESTNESS.
COMBINED FISH ROD AND REEL.
APPLICATION FILED MAY 12, 1913.
1,111,340.
Patented Sept. 22, 1914.
3 SHEETS—SHEET 3.
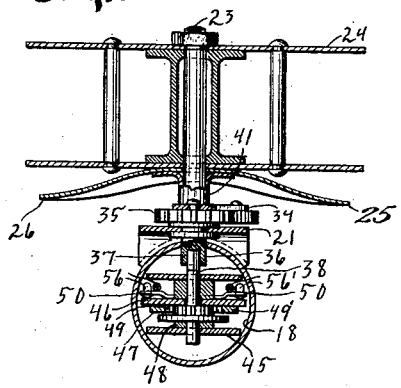
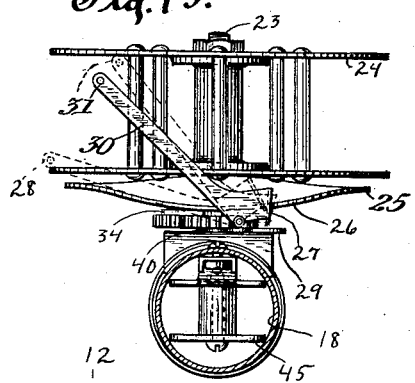
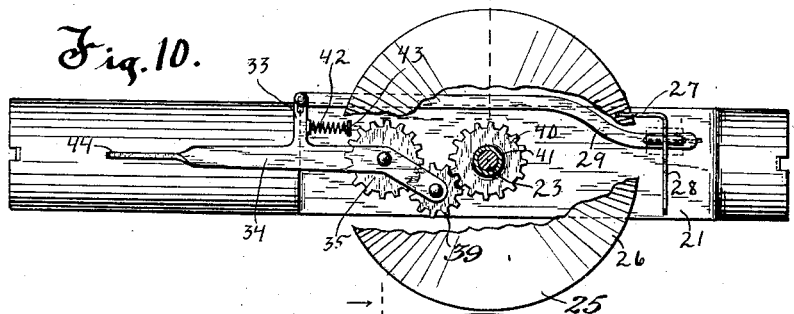
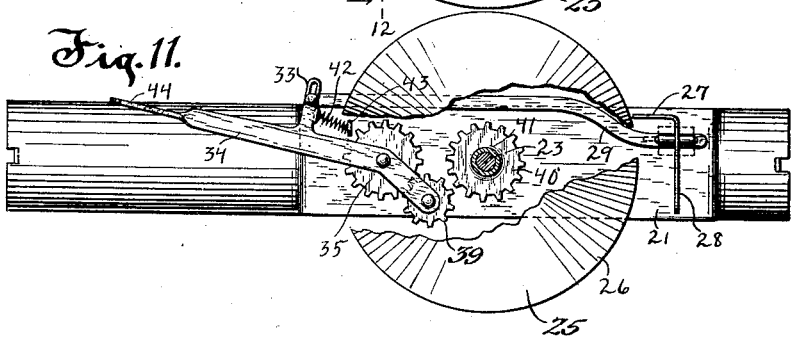
WITNESSES
C. F. Miller
Katherine Holt
INVENTOR.
Louis J. Westness
By Morrell and Caldwell
ATTORNEYS.

UNITED STATES PATENT OFFICE.

LOUIS J. WESTNESS, OF MILWAUKEE, WISCONSIN.

COMBINED FISH ROD AND REEL.

1,111,340.  Specification of Letters Patent.  Patented Sept. 22, 1914.

Application filed May 12, 1913. Serial No. 766,957.

*To all whom it may concern:*

Be it known that I, LOUIS J. WESTNESS, a citizen of the United States, and resident of Milwaukee, in the county of Milwaukee and State of Wisconsin, have invented new and useful Improvements in Combined Fish Rods and Reels, of which the following is a description, reference being had to the accompanying drawings, which are a part of this specification.

This invention relates to improvements in combined fish rods and reels.

It is one of the objects of this invention to provide a combined fish rod and reel in which the line on the reel is reeled in or out by a reciprocating movement of the rod handle.

A further object of the invention is to provide a combined fish rod and reel in which the direction of rotation of the reel may be reversed by a slight turn of the rod handle or the handle may be turned to an intermediate position to permit a free rotation of the reel spool in either direction.

A further object of the invention is to provide a combined fish rod and reel in which the line is guided by a spooling device to wind the line in a novel manner on the reel to prevent a back lash in casting.

A further object of the invention is to provide a novel means for transmitting a reciprocating movement into a continuous rotary movement which is particularly, although not solely, adapted for use in connection with fish line reels.

A further object of the invention is to provide a combined fish rod and reel in which the reel spool may be easily disengaged from the other mechanism to permit the free rotation of the reel spool in casting.

A further object of the invention is to provide a combined fish rod and reel which is of simple construction, is strong and durable and is well adapted for the purpose desired.

With the above and other objects in view, the invention consists of the improved combined fish rod and reel and its parts and combinations as set forth in the claims, and all equivalents thereof.

Figure 1:
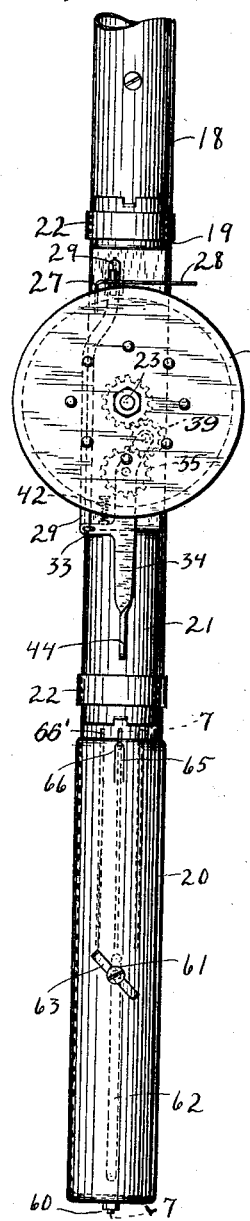
Figure 2:
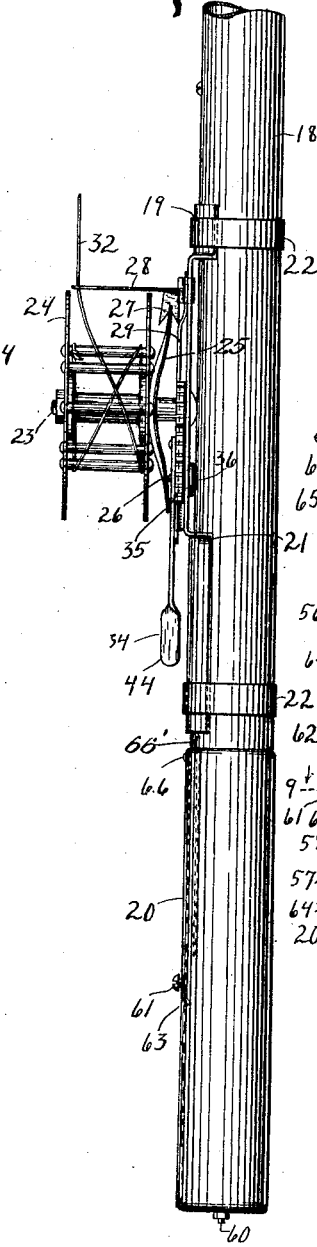
Figure 9:
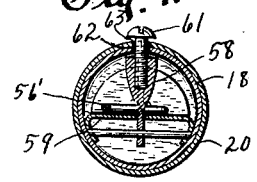
Figure 7:
Figure 8:
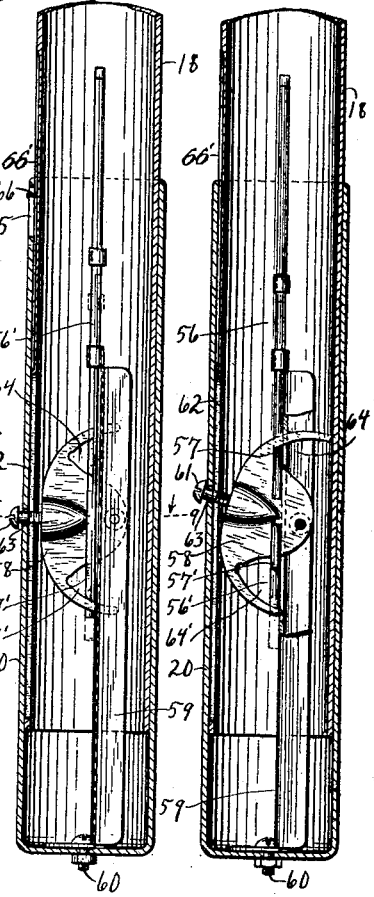

In the accompanying drawings in which the same reference characters indicate the same parts in all of the views: Figure 1 is a side view of the lower part of the improved combined fish rod and reel; Fig. 2 is a similar view taken at right angles to Fig. 1; Fig. 3 is a longitudinal sectional view thereof on a larger scale; Fig. 4 is a longitudinal sectional view of the combined fish rod and reel taken on line 4—4 of Fig. 3 showing the reciprocating mechanism in position to rotate the reel to wind up the line; Fig. 5 is a similar view thereof with the parts in position to pay out the line; Fig. 6 is a similar view thereof looking in the opposite direction of the parts in an intermediate position to permit the free rotation of the reel in either direction; Fig. 7 is a longitudinal sectional view of the handle portion of the rod taken on line 7—7 of Fig. 1; Fig. 8 is a similar view with a part in another position; Fig. 9 is a transverse sectional view taken on line 9—9 of Fig. 7; Fig. 10 is a side view of a portion of the rod with a part of the reel broken away to show other parts in the rear thereof; Fig. 11 is a similar view thereof with the gear disengaged to permit the spool of the reel to run free; Fig. 12 is a transverse sectional view taken on line 12—12 of Fig. 10; and Fig. 13 is a similar view taken on a line above the actuating mechanism.

Referring to the drawings the numeral 18 indicates the lower end portion of the improved combined fish rod and reel which is of tubular formation and is provided with a reel seat 19 and with a reciprocating handle 20. A reel frame 21 mounted on the reel seat and held in position by reel bands 22 which engage projecting portions of the said frame is provided with a fixed projecting spindle 23 upon which a reel drum 24 is journaled. The inner end of the drum is provided with a cam disk 25 having its peripheral edges deflected laterally on diametrically opposite edges to form cams 26 which are engaged by the shorter bifurcated arm 27 of a bell crank spooling lever 28. The lever 28 is pivoted to the outer end of a slidable bar 29 to provide for moving the lever into and out of engagement with the cam disk. The long arm 30 of the bell crank lever is provided with an eye 31 through which the line 32 passes and is guided back and forth to provide for each convolution crossing the previous convolution and being in turn crossed by the next succeeding coil to prevent the convolutions of one coil wedging in between the adjacent coils.

The inner end of the slidable bar 29 is pivoted to the projecting arm 33 of a controlling lever 34 which is pivoted on the outer face of the drive gear 35 and axially with relation to its shaft.

The drive gear 35 is provided with a projecting hub 36 which projects through and is journaled in the reel frame 21 and at its inner end is provided with a squared bore 37 into which enters the squared end of the drive shaft 38.

The inner end of the controlling lever 34 carries an idle pinion 39 which is in constant mesh with the gear 35 and is normally in mesh with a reel gear 40 mounted on the sleeve 41 of the reel drum 24. A coiled spring 42 interposed between the arm 33 and a projection 43 of the reel frame serves to normally swing the arm to a position so that its pinion will mesh with the reel drum gear. The outer end of the controlling lever is provided with a flattened or handle portion 44 which may be pressed by the thumb of the user when it is desired to disengage the gears and the spooling device in casting.

The drive shaft 38 extends through and is journaled in a frame 45 which is positioned within and fastened to the tubular end 18 of the rod. A reciprocating slotted member 46 positioned within the fixed frame 45 carries a slotted toothed plate 47 which is engaged by a pinion 48 mounted on the drive shaft 38. The elongated slot of the plate 47 is of greater width than the diameter of the pinion 48 and the inner opposite side edges of the portion of the plate forming the slot are cut to form opposite rack teeth 49 and 49' which alternately engage the pinion 48. The toothed plate 47 is connected at its opposite ends to the reciprocating member 46 by double bell crank levers 50 which are fulcrumed on the reciprocating member and have their medial arms 51 pivoted to the toothed plate to move the said plate laterally by a rocking parallelogram movement of the bell crank levers. The projecting pin like portions 52 of the medial arms which form the connections with the said plate extend through segmental slots 53 of the reciprocating member. The reciprocating member is provided with an elongated slot 54 through which the drive shaft 38 extends to permit the reciprocating movement of said member.

The outer arms 55 of the bell crank levers are pivotally connected to pairs of rods 56 and 56' and the opposite ends 57 and 57' of one rod of each pair are bent at right angles to engage a rock member 58 which is positioned within the lower end portion of the rod. The rods of each pair are fixedly connected together. The rock member is pivoted to a channeled plate 59 which is pivoted to the lower end of the reciprocating handle 20 by a screw 60 permitting the handle to turn and the medial outer edge portion of the said rock member is provided with a projecting screw or knob 61 which extends through an elongated slot 62 of the lower end portion of the rod and also through an angularly disposed slot 63 in the reciprocating handle portion 20.

The rock member 58 is provided with V-shaped recesses 64 and 64' in its inner edge portion on opposite sides of its pivotal connection with the channeled plate and into which recesses the angled ends of the connecting rods extend and are held and reciprocated by the said member so that by rocking the member forwardly the connecting rod 56 will be engaged and held and when rocked rearwardly the connecting rod 56' will be engaged and held, and when the arm is held in an intermediate position the toothed plate will be mounted to an intermediate position and disengaged from the drive shaft pinion.

To provide for conveniently adjusting the rock member the handle 20 is adapted to be given a partial turn in either direction and by means of the angularly disposd slot 63 and the projecting screw 61 the rock arm may be adjusted to either one of the three positions desired. The arm and the handle are held in adjusted positions by the spring tongue 65, the free end of which is provided with a projecting tooth 66 which enters the longitudinal grooves 66' formed in the tubular portion of the rod.

The toothed plate 47 is partly guided against lateral movement by being interposed between the slotted plate 46 and a washer 67 mounted on the drive shaft 38.

In operation the handle is reciprocated back and forth to likewise move the reciprocating member and the toothed plate and as the toothed plate at the beginning of each stroke is moved laterally by the bell crank levers and the connecting rods and the rock arm to alternately engage the opposite sides of the drive shaft pinion the said pinion will be driven continuously in the direction determined by the position of the rock arm. If it is desired to wind up the reel the rock arm is pushed forwardly by turning the handle to the right and the pair of connecting rods connected to the forward portion of the rock arm will control the movements of the double bell crank levers to move the teeth adjacent to said connecting rods into mesh with the pinion during the starting of the forward stroke and the opposite teeth during the starting of the return stroke. Assuming that the handle has been turned to the right and reciprocated back and forth in this position the toothed plate will be entirely controlled by the connecting rods engaged by the forward end of the rock arm and the bell crank levers will move the toothed plate laterally, alternately, in opposite directions at the beginning of each reciprocation so that the teeth of the opposite sides of the plate will alternately engage opposite sides of the pinion and rotate said pinion continuously in one direction to wind up the line. If the handle is now turned to the left the opposite teeth will engage the pinion during the forward stroke and the reel will be rotated in the opposite direction and by turning the handle to an intermediate position both rack teeth will clear the pinion.

In casting the controlling lever is depressed to swing the idle pinion out of mesh with the reel gear and to slide the spooling device out of engagement with the cam disk to permit the free running of the spool.

While the means for changing the reciprocating movement to a rotative movement has been described in connection with a rod and reel it is to be understood that it is applicable to other uses and it is to be understood that the claims are to be so construed.

From the foregoing description it will be seen that the combined rod and reel is well adapted for the purpose described.

What I claim as my invention is:

1. A device for changing reciprocating motion into rotary motion, comprising a reciprocating member, a rotary member, a pinion connected with the rotary member, a rack member having oppositely positioned sets of rack teeth to engage the pinion on opposite sides thereof alternately by lateral movements of the rack member, a pair of connecting means for connecting the rack member with the reciprocating member, means for rendering one connecting means or the other ineffective, and means operated by the connecting means for moving the rack member laterally, the direction of lateral movement of the rack member produced by one connecting means being opposite the direction of movement produced by the other connecting means, whereby the rotary member may be turned in either direction.

2. A means for converting reciprocating motion into rotary motion, comprising a reciprocating member, a rotary member, a pinion on the rotary member, a rack member having two sets of rack teeth for engaging the pinion on opposite sides thereof, said rack member being movable laterally to effect the engagement of one set of rack teeth or the other, a slide member, rocker arms carried by the slide member and connected to the rack member, a pair of connecting members connecting the opposite ends of the rocker arms with the reciprocating member, said rocker arms serving to move the rack member laterally to effect a different engagement of the pinion with the rack member in different directions of movement of the reciprocating member, the direction of lateral movement of the rack member produced by one connecting member being opposite to the direction of movement of the rack member produced by the other connecting member, and means for rendering one connecting member or the other ineffective.

3. A combined rod and reel, comprising a rod member, a reciprocating handle thereon, a reel mounted on the rod member, a transmission mechanism for changing the reciprocal movement of the handle to a continuous rotary movement of the reel, a pair of connectors between the handle and the transmission mechanism, one for producing rotary movement of the reel in one direction and the other for producing rotary movement of the reel in the other direction, and means for connecting the handle with either of the connectors for changing the direction of rotation of the reel.

4. A combined rod and reel, comprising a rod member, a reciprocating handle thereon, a reel mounted on the rod member, a transmission mechanism for changing the reciprocating movement of the handle to a continuous rotary movement of the reel, a pair of connectors between the handle and the transmission mechanism, one for producing rotary movement of the reel in one direction, and the other for producing rotary movement of the reel in the other direction, and means actuated by a rotary movement of the handle for connecting the handle with either of the connectors for changing the direction of rotation of the reel.

5. A combined rod and reel, comprising a tubular rod member, a reciprocating handle thereon, a reel mounted on the rod member, a pinion within the rod member having connection with the reel, a laterally movable rack member having oppositely positioned rack teeth to alternately engage the pinion, means for moving the rack member laterally to engage either series of rack teeth with the pinion, a pair of connecting members connecting the handle with the means for moving the rack member laterally, and means controlled by a rotary movement of the handle for rendering either of the connecting means ineffective.

6. A combined rod and reel, comprising a tubular rod member, a reciprocating handle thereon, a reel mounted on the rod member, a guide member slidably mounted within the rod, a rack member mounted on the guide member and having oppositely positioned rack teeth to engage with the opposite sides of the pinion, rocker arms mounted on the guide member and connected with the rack member for moving the rack member laterally to engage the rack teeth on either side of the pinion, a pair of connecting means connecting the rocker arms with the handle, and means controlled by a turning movement of the handle for rendering either of the connecting means ineffective.

7. A combined rod and reel, comprising a tubular rod portion provided with a reciprocating handle, a reel journaled on the rod portion, a spooling device actuated by the reel, a reciprocating mechanism within the tubular portion of the rod and comprising in part a laterally movable slotted plate having teeth formed on its opposite inner edges, said mechanism also including a reciprocating member provided with bell crank levers to which the slotted plate is pivotally connected, a pinion positioned to be alternately engaged on opposite sides by the teeth of the plate to rotate the pinion continuously in one direction, means for releasably connecting the pinion to the reel and for disconnecting the spooling device from the reel, a rock member carried by the handle and having a projecting portion which extends through an elongated slot angularly disposed in the handle, and rods connecting the bell cranks to the rock arm.

8. A combined rod and reel, comprising a tubular rod portion provided with a reciprocating and turnable handle, a reel journaled on the rod portion, a spooling device actuated by the reel, a reciprocating mechanism within the tubular portion of the rod and comprising in part a laterally movable slotted plate having teeth formed on its opposite inner edges, said mechanism also including a reciprocating member provided with bell crank levers to which the slotted plate is pivotally connected, a pinion positioned to be alternately engaged on opposite sides by the teeth of the plate to rotate the pinion continuously in one direction, means for releasably connecting the pinion to the reel and for disconnecting the spooling device from the reel, a rock member carried by the handle and having a projecting portion which extends through an elongated slot angularly disposed in the handle, and rods connecting the bell cranks to the rock arm.

9. Means for changing a reciprocating movement to a rotary movement, comprising a reciprocating member, levers carried thereby, a laterally movable plate connected to the levers and having rack teeth formed on opposite portions, a pinion positioned to be alternately engaged on opposite sides by the rack teeth, and means for actuating the levers to move the teeth of the plate alternately into engagement with the teeth of the opposite sides of the pinion.

10. Means for changing a reciprocating movement to a rotary movement, comprising a reciprocating member provided with an elongated slot, bell crank levers pivoted to opposite end portions of the said member, a laterally movable slotted plate pivoted at opposite portions to one of the arms of each lever, and having rack teeth formed on the opposite inner edge portions of the plate, a shaft extending through the slots and having a pinion positioned to be alternately engaged on opposite sides by the rack teeth, rods connecting the bell crank levers together and positioned on opposite end portions of the bell cranks, a rock member for positively engaging the rods on either end of the bell crank levers to change the direction of rotation of the pinion, and means for reciprocating the rock member.

In testimony whereof, I affix my signature, in presence of two witnesses.

LOUIS J. WESTNESS.

Witnesses:
C. H. KEENEY,
KATHERINE HOLT.

Copies of this patent may be obtained for five cents each, by addressing the "Commissioner of Patents, Washington, D. C."